United States Patent Office 3,513,222
Patented May 19, 1970

3,513,222
COMPOSITION CONTAINING EPOXY RESINS,
POLYVINYL CHLORIDE AND A DIESTER
OF ACRYLIC ACID AND A GLYCOL
Rene Speitel, Maienweg 14, Rheinfelden, Switzerland,
and Max R. Hegnauer, Im Steinacker, Aesch, near
Basel, Switzerland
No Drawing. Filed Feb. 20, 1967, Ser. No. 617,043
Claims priority, application Switzerland, Feb. 22, 1966,
2,541/66
Int. Cl. C08g 45/04
U.S. Cl. 260—836
8 Claims

ABSTRACT OF THE DISCLOSURE

Adherent corrosion-resistant coatings are produced upon substrates such as metal, glass, ceramic and earthenware, by coating with a polyvinyl chloride composition containing a small proportion, e.g. 5% of the weight of the polyvinyl chloride, of a solid precondensate of epichlorohydrin and a bis-phenol and, in addition, a cross-linking monomer which, under the conditions of use, acts as a solvent for the said reaction product and then stoving. When more than a surface coating of the polyvinyl chloride composition is required the said polyvinyl chloride compositions in dry blended form are subjected to a moulding operation to produce the desired form.

---

This invention relates to materials for the production of well-adhering and corrosion-resistant coatings, to the coating of articles with such materials and to a process for the manufacture of articles of polyvinyl chloride.

It is known that polyvinyl chloride plastisols, organosols and dry blended sintering powders when applied to metallic, glass or ceramic articles by such processes as dipping, slush-coating, spraying, electrostatic spraying and fluidised bed coating employing conventional techniques of application and without the aid of suitable adhesion promoters, do not give coatings of satisfactory adhesion to the substrates. Adhesion promoters may either be applied as a lacquer onto the articles to be coated before coating with polyvinyl chloride, or may be incorporated into the polyvinyl chloride coating composition. The latter procedure is preferred for economic reasons and is being progressively developed. At the same time numerous difficulties still remain to be overcome, such as the excessively rapid increase in viscosity of the polyvinyl chloride plastisols and organosols, excessive losses on stoving, unsatisfactory quality of the finished coatings or inadequate boil resistance, and a reduction in adhesion under the action of hot aqueous chemical reagents.

Amongst the numerous adhesion promoters which have been proposed representatives of two classes may be mentioned. Firstly, those monomers which polymerise and cross-link on heating, such as diallyl esters, acrylate esters, methacrylate esters and diesters of methacrylic acid, and secondly the liquid reaction products of epichlorhydrin and the bisphenols, i.e. the bisphenol-diglycidyl ethers (epoxide pre-condensates).

The adhesion promoters are for example used by partially or completely replacing the plasticisers used in the polyvinyl chloride plastisols and organosols, by the abovementioned monomers or by the abovementioned reaction products. The amount of adhesion promoter used depends upon the desired properties of the finished coating, namely whether it is to be soft, tough or hard and more or less temperature-resistant. Coatings of polyvinyl chloride pastisols and organosols of such a composition have very good mechanical and thermal properties and are resistant to most inorganic and to numerous organic dilute and concentrated acids, bases and salts and also to temperatures up to 150° C. and even for a short time up to 200° C. The adhesion of such coatings, for example to steel sheet, is outstanding but progressively decreases when subjected to the action of aqueous chemicals at raised temperature, and fails after a brief boiling in water or in the presence of a 3% concentration of synthetic wash liquids. This phenomenon also occurs after a short exposure to an alternation of successive cycles of 3 minutes in cold and 3 minutes in hot water or wash liquid, respectively.

It is known that the reaction products (epoxide precondensates) of epichlorhydrin and bisphenols polymerise to give hard materials under the influence of heat, particularly in the presence of suitable catalysts such as complex organic metal compounds, complexes of boron trifluoride, organic and inorganic acids, alcoholates, and phenolates, due to the presence of epoxide groups at the ends of the chain and of hydroxyl groups distributed along the chain. Coatings which for example adhere well to metal and glass can be produced in this way. On an industrial scale use is made of the ability of epoxide precondensates to undergo polyaddition with numerous so-called hardeners. Amongst these hardeners, amines, polyamide resins and polyisocyanates which react in the cold to produce hardening, whereas numerous others such as the phenolic resins, urea resins, melamine resins and alkyd resins have to be stoved at temperatures of between 150° and 220° C. in order to achieve hardening.

It is also known that the reaction products of epichlorhydrin and the bisphenols are strong hydrochloric acid acceptors because of the presence of epoxide groups, and are therefore outstanding heat stabilisers for polyvinyl chloride. Moreover, they act synergistically in the presence of organic tin complexes. In various polyvinyl chloride compositions the amount of the expensive organic tin complex used as a sabiliser can therefore be reduced to half or less by adding an epoxide precondensate.

The reaction products of epichlorhydrin with bisphenols, especially with 4,4'-dihydroxydiphenylpropane (bisphenol A), chemically represent diepoxide diglycidyl ethers which are liquid when the chain is short and therefore of low molecular weight, but become viscous and finally solid with melting points of above 150° C. as the length of the chain increases and the molecular weight becomes higher.

Hitherto, it has been proposed to use only the liquid low molecular weight epoxide precondensates as heat stabilisers since the solid higher molecular epoxide precondensates are not soluble in the usual plasticizers. For this purpose the epoxide precondensates are dissolved in the plasticiser used in amounts of 1 to 3% by weight based upon the weight of polyvinyl chloride. In this way soft to hard polyvinyl chloride compositions suitable for rolling, calendering, extrusion and injection moulding, as well as polyvinyl chloride plastisols and polyvinyl chloride organosols suitable for dipping, slush-coating, spreading and spraying are obtained.

The addition of 20 to 150 parts by weight of liquid epoxide precondensate per 100 parts of polyvinyl chloride has been recommended for plasticising polyvinyl chloride. Such quantities of solid epoxide precondensates cannot, however, be incorporated since, with the exception of the higher alcohols, the organic solvents for the solid epoxide precondensates (such as esters, ketones, ethers, chlorinated aliphatic solvents and aromatic solvents) attack polyvinyl chloride more or less rapidly, bringing about swelling or solution, and correspondingly reduce the pot life of the material. On the other hand higher alcohols can only be used to prepare organosols which contain more than 10% of the higher alcohol.

It is an object of the present invention to provide thermally stable, hot water resistant, acid resistant, alkali resistant and salt resistant coatings on, for example, metallic, glass or ceramic articles, such as internal and external coatings for washing machines, propellers, ships screws and pipes.

It has been found that the epoxide resin coatings are alkali resistant, but not acid ressitant. Polyvinyl chloride coatings made from polyvinyl chloride plastisols and polyvinyl chloride organosols are known to have good acid resistance, alkali resistance and salt resistance, and are resistant to hot water up to their softening point of about 50 to 70° C. By adding liquid epoxide precondensates to the polyvinyl chloride compositions heat-resistant coatings are obtained, but the hardening requires longer stoving times which the polyvinyl chloride will not withstand.

It was not hitherto known how solid epoxide precondensates would behave when added to polyvinyl chloride compositions. Since the solid epoxide precondensates are not soluble in the usual plasticisers, they could only be incorporated in polyvinyl chloride plastisols if it proved possible to find solvents for them which would not attack polyvinyl chloride at room temperature, either by swelling it or by dissolving it.

In accordance with the present invention there is provided a moulding and coating composition having a basis of polyvinyl chloride and containing, as addtiional ingredients, (a) at least one solid precondensate of epichlorohydrin and a bis-phenol and (b) at least one cross-linking monomer which, in liquid condition, is a solvent for said reaction product. The compositions of the invention may be in the form of a plastisol, an organosol or a dry, blended powder.

It has now been found that the monomeric allyl esters and the acrylic and methacrylic esters which contain at least two ethylenically unsaturated linkages are good solvents for the solid epoxide precondensates. Thus there may be used a bis-allyl ester of a dicarboxylic acid or a diester of acrylic and/or methacrylic acid with a diol. Examples include diallyl phthalate, ethylene glycol, butane diol and neopentyl glycol bis-acrylates and methacrylates. Polyvinyl chloride plastisols, organosols and dry blended powders which contain such monomers and in addition at least 5% by weight, based upon the polyvinyl chloride, of solid epoxide precondensates, on application to metals such as steel, aluminium and zinc, or to glass, ceramics and earthenware in known manner and subsequent heat treatment yield coatings having far superior properties to those in which no solid epoxide precondensate is present. Preferably the precondensate constitutes 5 to 20% of the weight of the polyvinyl chloride in the composition. In particular the adhesion when subjected to boiling synthetic washing liquids, both when submitted to several hours continuous treatment therewith and when subjected to the alternate influence of boiling lyes and cold wtaer (e.g. boiling and cold cycles alternating 100 times each), is outstanding. The solid epoxide precondensates used in accordance with the invention have shown themselves to be greatly superior to the liquid epoxide precondensates hitherto used since the latter, as already mentioned, require more than twice the stoving time in order to obtain coatings of satisfactory quality which have been cured throughout and which are free from tack.

The cross-linking monomer employed may be present in a proportion of from twice to five times the proportion by weight of the solid epoxide precondensate.

As a catalyst for the polymerisation of the monomer there may be present a peroxy compound or an azo compound, for instance an alkyl ester of perbenzoic acid or an azobishydrocarbyl dinitrile.

Suitable solid epoxide precondensates are, for example, "Epikote" condensates 1001 to 1009. The solid "Epikote" resins are reaction products of epichlorohydrin and bisphenol A and preferably have softening temperatures above 65° C., average epoxide equivalent weights of 450 to 4000, average epoxide values of 0.025 to 0.32, hydroxyl values of 0.34 to 0.77 and average molecular weights of 700 to 3800. Mixtures of liquid and solid epoxide precondensates may also be used.

Depending upon the desired properties of the coatings the composition of the polyvinyl chloride compositions used may be adjusted by varying the amounts of the various components (crosslinking monomers, epoxide precondensates, plasticisers, fillers and pigments, catalysts, stabilisers, flow regulators and tars). If low molecular epoxide precondensates are replaced by equal quantities of epoxide precondensates of progressively higher melting point and/or if the mixtures are heated for a longer time or to higher temperatures, then the coatings become progressively harder.

The epoxide precondensates may be incorporated into the polyvinyl chloride compositions in an extremely simple manner. Thus the epoxide precondensate may first be dissolved in the crosslinking monomer by stirring. The plasticiser or plasticisers, any catalyst for the polymerisation of the monomers, any heat stabilisers, the polyvinyl chloride, the fillers and the pigments are then added to the viscous solution, although it is not necessary to observe this sequence of addition. After aging for 2 to 24 hours at 20 to 25° C. during which penetration of the plasticisers into the polyvinyl chloride occurs the plastisol is adjusted to the desired viscosity; it can be thinned by for example adding "Tween 20", "Deplastol," (fatty acid polyglycol ester having a hydroxyl number of 140–150) white spirit or butanol, and can be thickened by adding materials which increase the thixotropy of the mass, such as "Aerosil" (silic acid) and "Thixine" (12-hydroxy stearate). The plastisol can very simply be converted into an organosol by thinning it with a suitable inert organic solvent such as white spirit or "Shellsol A" (solvent consisting mainly of $C_7$-alkylbenzenes, specific weight of 0.875 at 15° C.). In order to produce an organosol which may be electrostatically sprayed, an electrically conducting diluent such as butanol or diacetone alcohol may be used as thinner. An organosol which gives air-drying films may be produced by increasing the proportion of polyvinyl chloride and, if desired, of heat stabilisers in the original formulation, for example by doubling it, and at times also increasing the proportions of fillers or replacing them by other fillers which produce an increased thixotropic effect.

It is known that softer coatings can be produced by replacing the fillers partially or wholly by finely powdered polyethylene, which does not impair the adhesion of the coating but further increases the solvent resistance. A similar effect can be achieved by adding liquid highly viscous acrylonitrile rubber (e.g. "Hycar"). The hardness of the coatings and the resistance to boiling in alkaline wash liquids can be further increased by reacting a part of the polyfunctional groups of the reaction product of epichlorhydrin and a bisphenol with a known hardener which reacts by polyaddition on being heated, such as an alkyd resin, a phenolic resin, or a urea resin. In general 100 parts by weight of the epoxide precondensate are completely bonded by adding 25 parts by weight of one of the hardener resins in question. At the same time in order to preserve the heat stabilising effect of the epoxide precondensate and the film formation by further polymerisation, optionally with cross-linking, the free epoxide and hydroxyl groups must not all react with the added resin hardener, so that, for example, the addition of only 10 to 15 parts by weight, instead of 25 parts by weight, of the hardener per 100 parts by weight of epoxide precondensate is advisable. The crosslinking very greatly diminishes migration, evaporation and extraction of plasticiser.

The composition of a dry blended powder for sintering only varies in principle from that of a plastisol by the filler content being reduced to the point consistent with ensuring good flow on gelling and fusing. The homogenisation and partial gelling of the mixture may take place in a mixer running at a moderate speed, and care should be taken so that the temperature, which rises due to friction, does not exceed 100 to 110° C., since it is essential that the temperature remains below the polymerisation temperature of the added crosslinking monomers. As in the case of plastisols and organosols, softer or harder coatings and higher temperature resistance are obtained depending upon the composition of the mixture (monomer content, type of monomer, amount and type of plasticiser, fillers and so on), as well as upon the stoving temperature and the stoving time.

The polyvinyl chloride plastisols and organosols may be applied to articles to be coated by the known processes, such as by dipping, slush-coating, spreading, spraying and electrostatic spraying. The dry blended mixtures are, inter alia, suitable for fluidised bed coating, electrostatic spraying and atomisation. The gelling and stoving temperature is usually between 170 and 250° C. for 30 to 10 minutes or even less. The stoving temperature and stoving time are inversely proportional to one another and depend upon the desired hardness and the thickness of the coating.

Metal sheets coated as described above may be heat-welded together. Moreover, pipes which have been coated as described may be united by a sleeve connection which is heat-resistant by filling the gap in the sleeve with the plastisol used for coating. Pipes or metal sheets coated with polyvinyl chloride compositions in accordance with the invention may also be united with cold or hot hardening epoxide resins or with polyester resins and thiokols in a heat-resistant manner.

By reason of the exceptionally high mechanical, physical and thermal strength properties and their chemical resistance the resulting coatings are most suitable for use as an effective protection against corrosion, particularly against sanitary waste water (brine) of constantly changing temperature.

The dry blended powders of the present invention may also be compression-moulded whilst heating to form sheets and mouldings, or may be extruded or injection moulded to form pipes, profiles or mouldings, and subsequently heat-hardened. Sheets manufactured in this way may be welded to coatings maufactured in accordance with the invention.

The adhesion to glass, earthenware and ceramics of the polyvinyl chloride coatings produced in accordance with the invention is outstanding.

The following examples illustrate the nature of the invention. All parts are parts by weight.

EXAMPLE 1

A plastisol is produced by dissolving 60 parts of "Epikote 1001" (average molecular weight 900) in 220 parts of 1,4-butanediol dimethacrylate, with stirring. 200 parts of dioctyl phthalate, 6 parts of 50% tert.-butyl perbenzoate, 6 aprts of "Estabex EN" (modified dibutyl tin maleate), 600 parts of polyvinyl chloride, 60 parts of titanium dioxide, 50 parts of mica and 100 parts of chalk are added to the viscous solution in any desired sequence. When applied by dipping, slush-coating, spreading, spraying or electrostatic spraying and stoved for 30 minutes at 170° C., the plastisol yields a white coating on metal, glass or ceramic articles.

If the pigments are omitted from the plastisol a clear film is obtained.

EXAMPLE 2

Proceeding as described in Example 1 a plastisol is prepared from the following ingredients:

| | Parts |
|---|---|
| "Epikote 1007" (average molecular weight 2900) | 50 |
| Diallyl phthalate | 200 |
| Phthalate 610-ester, $C_6$—$C_8$—$C_{10}$ mixture | 180 |
| "Witamol" [1] | 20 |
| Azodicyclohexyl cyanide ("Genitron CHDN") | 8 |
| "Estabex EN" | 6 |
| Polyvinyl chloride | 600 |
| Carbon black | 1 |
| Calcium magnesium double carbonate | 160 |

[1] Plasticiser consisting of diesters of phthalic acid with heptyl, octyl, isononyl, isodecyl and isotridecyl alcohols.

After aging for 24 hours at 20 to 25° C. 2 parts by weight of "Tween 20" (polyoxyethylene sorbitane monolaurate) are added as a flow regulator and the procedure is continued as described in Example 1. Black coatings are obtained.

EXAMPLE 3

Proceeding as described in Example 1 an organosol is prepared from the following ingredients:

| | Parts |
|---|---|
| "Epikote 1004" (average molecular weight 1400) | 75 |
| Ethylene glycol dimethacrylate | 200 |
| Dioctyl phthalate | 100 |
| Dioctyl sebacate | 100 |
| Tertiary butyl perbenzoate | 6 |
| "Estabex EN" | 7 |
| Polyvinyl chloride | 1000 |
| Titanium dioxide | 75 |
| Talc | 100 |
| Barytes | 300 |

After aging for 24 hours at 20 to 25° C. 100 parts of white spirit and 150 parts of n-butanol are added in order to obtain an organosol. Thereafter the procedure described in Example 1 is followed. White coatings are obtained.

EXAMPLE 4

A dry blended sintering powder is prepared from the following ingredients:

| | Parts |
|---|---|
| Polyvinyl chloride | 600 |
| Phthalate 610 | 75 |
| Dioctyl phthalate | 75 |
| Neopentyl glycol dimethacrylate | 150 |
| Titanium dioxide | 60 |
| Tertiary butyl perbenzoate (50% concentration) | 6 |
| "Estabex EN" | 6 |
| "Epikote 1009" (average molecular weight 3800) | 60 |
| "Deplastol" (neutral fatty acid ester, flow regulator) | 3 |
| Chalk | 50 |
| Micro-asbestos | 10 |

The ingredients are mixed at below 100° C. in a mixer which runs at a moderate speed, the dry blended product is sieved to a particle size of 50 to 200μ for fluidised bed coating or to below 50μ for electrostatic spraying, and the applied coating is then sintered at 240 to 280° C. White coatings are obtained.

We claim:
1. A moulding and coating composition having a basis of polyvinyl chloride and containing (a) from 5 to 20% by weight of the polyvinyl chloride of at least one solid precondensate of epichlorohydrin and a bis-phenol, and (b) at least one ethylenically unsaturated cross-linking monomer selected from the group consisting of diesters of acrylic and methacrylic acids with diols in a proportion of from 2 to 5 times the weight of the solid precondensate.

2. A composition claimed in claim 1, and further containing a plastisol-producing proportion of a plasticiser for polyvinyl chloride.

3. A composition claimed in claim 1, and further containing a plastisol-producing proportion of a plasticiser for polyvinyl chloride and a thinner.

4. A composition claimed in claim 1 in which said precondensate has a softening temperature above 65° C., an average epoxide equivalent of 450 to 4000, an average epoxide value of 0.025 to 0.32, a hydroxyl value of 0.34 to 0.77 and an average molecular weight of 700 to 3800.

5. A composition claimed in claim 1, and further containing a peroxy compound as a catalyst for the polymerization of the monomer.

6. A process for producing a strongly adherent, corrosion-resistant coating upon an article which comprises applying to at least one surface of said article a coating of a composition as defined in claim 1 and stoving the resultant coated article for 10 to 30 minutes at 250° C. to 170° C.

7. A process as claimed in claim 8 in which said article is formed of metal, glass, ceramic or earthenware.

8. A process for producing a shaped article which comprises moulding a dry, blended composition as defined in claim 1.

References Cited

UNITED STATES PATENTS 2,609,355  9/1952  Winkler _____ 260—837
2,892,808  6/1959  Shafer _____ 260—837

FOREIGN PATENTS 742,765  9/1966  Canada.

MURRAY TILLMAN, Primary Examiner

P. LIEBERMAN, Assistant Examiner

U.S. Cl. X.R.

117—123, 124, 132, 161; 260—23, 31.8, 33.6, 41, 41.5, 45.75, 47, 831, 834, 835, 837